(12) United States Patent
Ohkubo et al.

(10) Patent No.: US 8,501,356 B2
(45) Date of Patent: Aug. 6, 2013

(54) NONAQUEOUS ELECTROLYTE BATTERY

(75) Inventors: Kazusa Ohkubo, Kyoto (JP); Koji Sukino, Kyoto (JP); Shigeki Yamate, Kyoto (JP); Suguru Kozono, Kyoto (JP); Yoshihiro Katayama, Kyoto (JP); Toshiyuki Nukuda, Kyoto (JP)

(73) Assignee: GS Yuasa International Ltd., Tokyo (JP)

( * ) Notice: Subject to any disclaimer, the term of this patent is extended or adjusted under 35 U.S.C. 154(b) by 347 days.

(21) Appl. No.: 12/736,060

(22) PCT Filed: Mar. 4, 2009

(86) PCT No.: PCT/JP2009/054028
§ 371 (c)(1), (2), (4) Date: Sep. 3, 2010

(87) PCT Pub. No.: WO2009/110490
PCT Pub. Date: Sep. 11, 2009

(65) Prior Publication Data
US 2011/0027663 A1    Feb. 3, 2011

(30) Foreign Application Priority Data
Mar. 5, 2008  (JP) .................................. 2008-054942

(51) Int. Cl.
*H01M 6/16* (2006.01)

(52) U.S. Cl.
USPC ........... 429/342; 429/332; 429/341; 429/343; 429/200; 429/307; 429/231.5; 429/231.95; 429/231.1; 252/62.2

(58) Field of Classification Search
USPC .................. 429/342, 332, 341, 343, 200, 307, 429/231.5, 231.95, 231.1; 252/62.2
See application file for complete search history.

(56) References Cited

U.S. PATENT DOCUMENTS

| | | | |
|---|---|---|---|
| 6,379,846 B1 * | 4/2002 | Terahara et al. | 252/62.2 |
| 2007/0048623 A1 * | 3/2007 | Park et al. | 429/332 |

FOREIGN PATENT DOCUMENTS

| | | |
|---|---|---|
| EP | 1143550 A1 | 10/2001 |
| JP | 2001-052965 A | 2/2001 |
| JP | 2001-057237 A | 2/2001 |
| JP | 2001-283908 A | 10/2001 |
| JP | 2004-259682 A | 9/2004 |
| JP | 2006-012806 A | 1/2006 |
| JP | 2007-141831 A | 6/2007 |
| JP | 2007-149656 A | 6/2007 |
| JP | 2007-214120 A | 8/2007 |
| JP | 2007-042440 A | 9/2007 |
| JP | 2007-273154 A | 10/2007 |
| JP | 2008-186803 A | 8/2008 |

OTHER PUBLICATIONS

Shoichiro Mori et al., "*Chemical properties of various organic electrolytes for lithium rechargeable batteries / 1. Characterization of passivating layer formed on graphite in alkyl carbonate solutions*," Journal of Power Source, vol. 68, pp. 59-64, Elsevier Science S.A., (1997).
International Search Report mailed on Jun. 23, 2009.
Zhang, "A review on electrolyte additives for lithium-ion batteries," ScienceDirect, Journal of Power Sources, vol. 162, pp. 1379-1384 (2006).
Extended European Search Report for European patent application No. 09717799.2, dated Apr. 9, 2012.

* cited by examiner

*Primary Examiner* — Laura Weiner
(74) *Attorney, Agent, or Firm* — Rader, Fishman & Grauer PLLC

(57) ABSTRACT

An additive typified by tris(trimethylsilyl)phosphate, tris(trimethylsilyl)borate, and tetrakis(trimethylsiloxy)titanium (Chem. 3) are applied to a nonaqueous electrolyte containing a chain carbonate and/or a chain carboxylate as a main solvent (contained at a ratio of 70 volume % or higher). It is preferable that $0 \leq a < 30$ is satisfied, in which "a" denotes the volume of a cyclic carbonate among carbonates having no carbon-carbon double bond in the entire volume, defined as 100, of the carbonates having no carbon-carbon double bond and chain carboxylates in a nonaqueous solvent contained in the nonaqueous electrolyte ($0 < a < 30$ in the case no chain carboxylate is contained).

12 Claims, No Drawings

NONAQUEOUS ELECTROLYTE BATTERY

TECHNICAL FIELD

The invention relates to a nonaqueous electrolyte battery, particularly to a nonaqueous electrolyte battery provided with a negative electrode having an operating potential of 1.2 V (vs. Li/Li$^+$) or higher.

BACKGROUND ART

Nonaqueous electrolyte batteries typified by a lithium ion secondary battery have been used widely in recent years as power sources for mobile appliances typified by a mobile phone since these batteries have high energy densities.

In the present common lithium ion secondary batteries, transition metal oxides such as lithium cobaltate are used as a positive active material and carbonaceous materials such as graphite are used as a negative active material. With respect to a negative electrode using graphite or the like for the negative active material, the insertion/extraction reaction of the lithium ion is carried out in a potential region range of about 0.2 V or lower relative to the lithium potential. As described above, since the negative electrode using graphite or the like as the negative active material has a low operating potential, a lithium ion secondary battery using the negative electrode is enabled to reliably have high battery voltage and high energy density.

To stably operate such a negative electrode with a low operating potential, it is indispensable to add a cyclic carbonate compound such as ethylene carbonate or propylene carbonate to a nonaqueous solvent to be used for a nonaqueous electrolyte. It is because the cyclic carbonate compound has a high dielectric property required to dissociate an electrolytic salt and exhibit high ion conductivity and at the same time has a property to form a protection film on a surface of the negative electrode, which is necessary for reliably retaining chemical stability and electrochemical stability between the negative electrode and an electrolyte. In a lithium ion secondary battery using graphite or the like for the negative active material, the characteristics of the protection film changes according to the type of a solvent and an additive to be used for an electrolyte solution and is known as a main factor in determining battery performance by affecting the ion migration or charge transfer (e.g., refer to Non-Patent Document 1).

However, a lithium ion secondary battery using graphite or the like as a negative active material has an issue of stability in relation to an electrolyte solution particularly at a high temperature and a problem of lowering the battery performance because of the low operating potential of the negative electrode. When quick charge is carried out at a low temperature, because of low operating potential of the negative electrode, there is a problem that metal lithium is precipitated to form dendrite on the negative electrode and it also leads to deterioration of the battery performance.

Recently, it has been expected that a nonaqueous electrolyte battery would be employed not only for power sources for small appliances but also for power sources for power storage equipment and middle to large scale industrial uses such as motive power sources for vehicles, e.g., HEV and therefore, technological development have been actively addressed. Particularly, a battery for hybrid automobiles is required to have a high output performance for instantaneously driving a motor for assisting the engine power and a high input performance for regenerating the energy when automobiles stop, especially at a low temperature, which is a severe condition. Further, since the battery is to be exposed at a high temperature in the case of driving automobiles or parking automobiles under the boiling sun, it is required to keep the low-temperature-input/output performances even after storage at high temperature. On the other hand, in such a use, a large number of batteries are often assembled and used and exchange of batteries costs labor cost and the like and therefore, a long life in terms of charge-discharge cycle performance is required rather than the properties such as high voltage and high energy density.

Consequently, a material typified by lithium titanate is proposed as a negative active material, which has a nobler operating potential about 1.5 V to the lithium potential as compared with a carbon material and arises a stable insertion/extraction reaction of the lithium ion.

Patent Document 1 discloses an invention of an electrolyte solution for a capacitor consisting of an electrolyte and an electrolytic solvent containing a compound having a Si-containing group. Patent Document 1 describes that a capacitor using an active carbon electrode and an electrolytic solvent containing a Si compound as a nonaqueous electrolyte solution has decreased electric current leakage and that the apparent deformation degree of a product is suppressed in a 70° C. load test.

However, even if the gas emission at a high temperature is suppressed, it does not mean that the retention rate of the low-temperature-output performance after storage at high temperature would be improved and as shown in the examples given later, no correlation between the thickness and the output power performance of the battery after high-temperature-storage is found. Further, Patent Document 1 does not describe or suggest how the low-temperature-output performance would be after high-temperature-storage in the case of a nonaqueous electrolyte battery equipped with a negative electrode having an operating potential of 1.2 V (vs. Li/Li$^+$) or higher and it cannot be derived from Patent Document 1 that the low-temperature-output performance would be improved after high-temperature-storage by adding at least one kind of compound selected from a group of compounds defined by general formulas (1) to (3) described later to a nonaqueous electrolyte of a nonaqueous electrolyte battery provided with a negative electrode having an operating potential of 1.2 V (vs. Li/Li$^+$) or higher.

Patent Document 2 describes an invention characterized in that a nonaqueous solvent containing a compound having a (metal element, phosphorus, or boron)-(oxygen)-(silicon) bond is used for a nonaqueous electrolyte solution for a lithium secondary battery. In Table 1 of Patent Document 2, it is shown that the leakage current in charging, which shows the electric decomposition amount of an electrolyte solution on graphite, is lowered by adding tri(trimethylsilyl)borate, tri(trimethylsilyl)phosphate, or titanium tetra(trimethylsiloxide) as the compound having a (metal element, phosphorus, or boron)-(oxygen)-(silicon) bond to a solvent containing EC and DMC at 40:60 in a coin type battery having a graphite negative electrode and a metal lithium foil.

However, Patent Document 2 does not describe or suggest how the low-temperature-output performance would be after storage at high temperature in the case of a nonaqueous electrolyte battery equipped with a negative electrode having an operating potential of 1.2 V (vs. Li/Li$^+$) or higher and it cannot be derived from Patent Document 2 that the low-temperature-output performance would be improved after high-temperature-storage by adding at least one kind of compound selected from a group of compounds defined by general formulas (1) to (3) described later to a nonaqueous electrolyte of a nonaqueous electrolyte battery provided with a negative electrode having an operating potential of 1.2 V (vs. Li/Li$^+$) or higher.

Patent Document 3 proposes a nonaqueous electrolyte battery characterized in that a compound containing at least B and S is contained in the inside of the nonaqueous electrolyte battery. There is a description in Patent Document 3 that "addition of at least one kind of compound containing B and Si to a nonaqueous electrolyte battery suppresses contact of an electrolyte solution and a negative electrode by formation of a film on the negative electrode surface by the compound and thus the decomposition reaction of the electrolyte solution on the negative electrode is decreased and accordingly, a battery with high reliability and an excellent preservation property can be obtained" (paragraph 0034). Patent Document 3 describes that the capacity recovery ratio (capacity after storage/capacity before storage×100(%)) after storage at 80° C. for 5 days was improved by using LiCoO$_2$ for a positive electrode and meso-phase graphite for a negative electrode and adding tris(trimethylsilyl)borate to a nonaqueous electrolyte.

However, there is neither a description of how the output performance at low temperature would be after storage at high temperature storage in the case of a nonaqueous electrolyte battery equipped with a negative electrode having an operating potential of 1.2 V (vs. Li/Li$^+$) or higher nor a description of a nonaqueous electrolyte battery having more than 70 volume % of a chain carbonate and less than 30 volume % of a cyclic carbonate ester in a nonaqueous solvent composing a nonaqueous electrolyte. Consequently, the fact that the output performance at low temperature after storage at high temperature is made excellent by using a negative electrode containing a negative active material capable of inserting/extracting the lithium ion at a potential of 1.2 V or higher relative to the lithium potential and containing at least one kind of compound selected from a group of compounds defined by the general formulas (1) to (3) in the nonaqueous electrolyte is not derived from Patent Document 3. Particularly, it cannot be derived from Patent Document 3 that it is preferable to keep the volume ratio of the cyclic carbonate be 10 volume % or lower in the entire volume of carbonates contained in the nonaqueous solvent composing the nonaqueous electrolyte.

Patent Document 4 describes that the initial discharge capacity is increased in a nonaqueous lithium secondary battery characterized in that a nonaqueous electrolyte solution contains lithium oxalate and a Lewis acid compound, and there is a description that "the Lewis acid compound is at least one kind of compound selected from (CH$_3$(CH$_2$)$_2$O)$_3$B, (CH$_3$(CH$_2$)$_3$O)$_3$B, ((CH$_3$)$_3$SiO)$_3$B, ((CF$_3$)$_2$CHO)$_3$B, ((CH$_3$)$_3$SiO)$_3$P, and ((CF$_3$)$_2$CHO)$_3$P" (claim 2). Patent Document 4 describes that "since addition of a Lewis acid compound, that is, a compound soluble in an organic solvent and having an electron-accepting property in addition to lithium oxalate, improves the solubility of lithium oxalate" (paragraph 0006): and that dissolution of lithium oxalate in a nonaqueous electrolyte solution is important to provide a battery with a large initial discharge capacity.

However, there is neither a description of how the low-temperature-output performance would be after storage at high temperature in the case of a nonaqueous electrolyte battery equipped with a negative electrode having an operating potential of 1.2 V (vs. Li/Li$^+$) or higher nor a description of a nonaqueous electrolyte battery having more than 70 volume % of a chain carbonate and less than 30 volume % of a cyclic carbonate in a nonaqueous solvent composing a nonaqueous electrolyte. Consequently, the fact that the output performance at low temperature after high-temperature-storage is made excellent by using a negative electrode containing a negative active material capable of inserting/extracting the lithium ion at a potential of 1.2 V or higher relative to the lithium potential and containing at least one kind of compound selected from a group of compounds defined by the general formulas (1) to (3) in the nonaqueous electrolyte is not derived from Patent Document 4. Particularly, it cannot be derived from Patent Document 4 that it is preferable to keep the volume ratio of the cyclic carbonate ester be 10 volume % or lower in the entire volume of carbonates contained in the nonaqueous solvent composing the nonaqueous electrolyte.

Patent Document 5 proposes an invention characterized by adding a first additive having a reduction potential with a LUMO level between 0.3 and 0.5 eV calculated by the AM1 method among the quantum chemical calculation methods and a second additive having a reduction potential with a LUMO level between −0.2 and 0.3 eV or between 0.5 and 1 eV calculated by the AM1 method among the quantum chemical calculation methods. In Table 2 of Patent Document 5, there is a description that the discharge capacity at −20° C., suppression of swelling after storage at 85° C., and the cycle life in a range of 10 to 60° C. are improved in the case of using trimethylsilyl phosphate or a mixture of LiBF$_4$ and trimethylsilyl phosphate as the first additive and fluoroethylene carbonate, vinylene carbonate, or a mixture thereof as the second additive.

However, there is neither a description of how the low-temperature-output performance would be after high-temperature-storage in the case of a nonaqueous electrolyte battery equipped with a negative electrode having an operating potential of 1.2 V (vs. Li/Li$^+$) or higher nor a description of a nonaqueous electrolyte battery having more than 70 volume % of a chain carbonate and less than 30 volume % of a cyclic ester in a nonaqueous solvent composing a nonaqueous electrolyte. Consequently, the fact that the output performance at low temperature after storage at high temperature is made excellent by using a negative electrode containing a negative active material capable of inserting/extracting the lithium ion at a potential of 1.2 V or higher relative to the lithium potential and containing at least one kind of compound selected from a group of compounds defined by the general formulas (1) to (3) in the nonaqueous electrolyte is not derived from Patent Document 5. Particularly, it cannot be derived from Patent Document 5 that it is preferable to keep the volume ratio of the cyclic carbonate be 10 volume % or lower in the entire volume of carbonates contained in the nonaqueous solvent composing the nonaqueous electrolyte.

Claims 1 of Patent Documents 6 to 8 describe the general formula (3) which include a compound defined by the general formula (1) characterizing the present invention as a narrower concept. In examples of Patent Documents 6 to 8, batteries using electrolyte solutions containing trimethylsilyl methanesulfonate as a compound corresponding to the general formula (3) are described.

Patent Document 6 describes an invention characterized in that a nonaqueous electrolyte solution contains a chain carboxylatecarboxylate as an indispensable component and also a compound containing Si—O-A (A is a group consisting of H, C, N, O, F, S, Si and/or P) in a molecule in order to improve the low-temperature-output performance and also describes that the output performance at −30° C. is improved by adding trimethylsilyl methanesulfonate to a nonaqueous electrolyte battery having a positive electrode containing LiCoO$_2$, a negative electrode containing graphite, and a nonaqueous electrolyte solution obtained by mixing 1 mol/L of LiPF$_6$ with a mixture of ethylene carbonate (EC), methyl ethyl carbonate (MEC) and one of methyl propionate (MP), ethyl acetate (EA), and methyl acetate (MA) at 3:6:1 in volume ratio.

However, there is no description of how the low-temperature-output performance would be after high-temperature-storage in the case of a nonaqueous electrolyte battery equipped with a negative electrode having an operating potential of 1.2 V (vs. Li/Li$^+$) or higher. Further, as shown in examples provided later, in the case of using trimethylsilyl methanesulfonate, with which it is proved that the output performance is improved at low temperature, for a nonaqueous electrolyte battery having a negative electrode having an operating potential of 1.2 V (vs. Li/Li$^+$) or higher, the low-temperature-output performance is surely improved immediately after production of the battery; however, the output retention rate after the high temperature storage test is comparative to that in the case of using no additive and thus the problems of the invention cannot be solved. Further, also in the case a compound encompassed by the general formula described in Patent Document 6 is added to a nonaqueous electrolyte battery containing a negative electrode of a carbon material with an operating potential lower than 1.2 V (vs. Li/Li$^+$) and a chain carboxylate (methyl acetate or the like) and a cyclic carbonate (ethylene carbonate) as nonaqueous electrolytes, the low-temperature-output performance is improved immediately after production of the battery; however, the output retention rate after the high temperature storage test is comparative to that in the case of using no additive and thus the problems of the invention cannot be solved. Consequently, the fact that the output performance at low temperature after storage at high temperature is made excellent by using a negative electrode containing a negative active material capable of inserting/extracting the lithium ion at a potential of 1.2 V or higher relative to the lithium potential and containing at least one kind of compound selected from a group of compounds defined by the general formulas (1) to (3) in the nonaqueous electrolyte is not derived from Patent Document 6.

Patent Document 7 describes an invention characterized in that the ratio of ethylene carbonate in a nonaqueous solvent is adjusted to be 1 to 25 volume % and a nonaqueous electrolyte solution contains a compound containing Si—O-A (A is a group consisting of H, C, N, O, F, S, Si and/or P) in a molecule in order to improve the low-temperature-output performance and also describes that the output performance at −30° C. is improved by adding trimethylsilyl methanesulfonate to a nonaqueous electrolyte battery having a positive electrode containing LiCoO$_2$, a negative electrode containing graphite, and a nonaqueous electrolyte solution obtained by mixing 1 mol/L of LiPF$_6$ with a mixture of ethylene carbonate (EC) and methyl ethyl carbonate (MEC).

However, there is no description of how the low-temperature-output performance would be after high-temperature-storage in the case of a nonaqueous electrolyte battery equipped with a negative electrode having an operating potential of 1.2 V (vs. Li/Li$^+$) or higher. Further, as shown in examples provided later, in the case of using trimethylsilyl methanesulfonate, with which it is proved that the output performance is improved at low temperature, for a nonaqueous electrolyte battery having a negative electrode with an operating potential of 1.2 V (vs. Li/Li$^+$) or higher, the low-temperature-output performance is surely improved immediately after production of the battery; however, the output retention rate after the high-temperature-storage test is comparative to that in the case of using no additive and thus the problems of the invention cannot be solved. Consequently, the fact that the output performance at low temperature after storage at high temperature is made excellent by using a negative electrode containing a negative active material capable of inserting/extracting the lithium ion at a potential of 1.2 V or higher relative to the lithium potential and containing at least one kind of compound selected from a group of compounds defined by the general formulas (1) to (3) in the nonaqueous electrolyte is not derived from Patent Document 7.

Patent Document 8 describes an invention characterized in that a negative active material contains a metal oxide containing titanium, which is capable of absorbing and desorbing lithium and also a compound containing the following formula Si—O-A (A is a group consisting of H, C, N, O, F, S, Si and/or P) in a molecule in order to improve the low-temperature-output performance and in Examples 4 to 6, there is a description that the output resistance is lowered by using a lithium-titanium composite oxide for a negative electrode and using, as a solvent for a nonaqueous electrolyte solution, a solvent obtained by mixing trimethylsilyl methanesulfonate with a mixture of ethylene carbonate, dimethyl carbonate, and methyl ethyl carbonate (volume ratio 3:3:4).

However, as shown in examples provided later, in the case of using trimethylsilyl methanesulfonate, with which it is proved that the output performance is improved at low temperature, for a nonaqueous electrolyte battery with a negative electrode having an operating potential of 1.2 V (vs. Li/Li$^+$) or higher, the low-temperature-output performance is surely improved immediately after production of the battery; however, the output retention rate after the high-temperature-storage test is comparative to that in the case of using no additive and thus the problems of the invention cannot be solved. Consequently, the fact that the output performance at low temperature after storage at high temperature is made excellent by using a negative electrode containing a negative active material capable of inserting/extracting the lithium ion at a potential of 1.2 V or higher relative to the lithium potential and containing at least one kind of compound selected from a group of compounds defined by the general formulas (1) to (3) in the nonaqueous electrolyte is not derived from Patent Document 8.

Non-Patent Document 1: J. Power Source, 68 (1997) 59-64
Patent Document 1: JP-A No. 2001-52965
Patent Document 2: JP-A No. 2001-57237
Patent Document 3: JP-A No. 2001-283908
Patent Document 4: JP-A No. 2004-259682
Patent Document 5: JP-A No. 2006-12806
Patent Document 6: JP-A No. 2007-141831
Patent Document 7: JP-A No. 2007-149656
Patent Document 8: JP-A No. 2007-214120

DISCLOSURE OF THE INVENTION

Problems to be Solved by the Invention

The present invention has been made in view of the above state of the art and it is an object of the invention to provide a nonaqueous electrolyte battery provided with an excellent low-temperature-output performance even after high-temperature-storage.

Means for Solving the Problems

The configuration and effects of the invention are as described in the following. However, the operation mechanisms described in this specification include assumptions and their adequacy does not at all limit the present invention.

The invention provides a nonaqueous electrolyte battery provided with a nonaqueous electrolyte containing a nonaqueous solvent and an electrolytic salt, a positive electrode, and a negative electrode having an operating potential of 1.2 V (vs. Li/Li$^+$) or higher and characterized in that the nonaqueous electrolyte contains a chain carbonate and/or a chain carboxylate as a main solvent at a ratio of 70 volume % or higher in the entire volume of the nonaqueous solvent and contains a compound defined by a general formula (1), (2), or (3):

[Chem. 1]

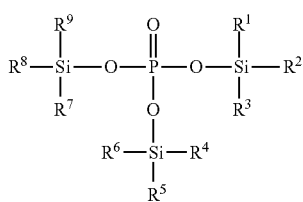

(1)

wherein R$^1$ to R$^9$ may be same or different and each denotes an organic group having 1 to 12 carbon atoms;

[Chem. 2]

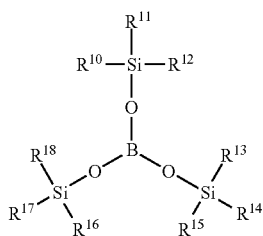

(2)

wherein R$^{10}$ to R$^{18}$ may be same or different and each denotes an organic group having 1 to 12 carbon atoms; and

[Chem. 3]

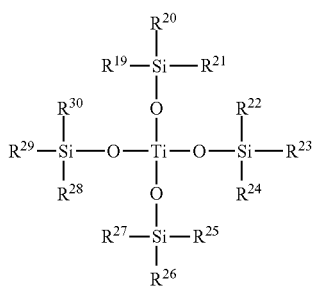

(3)

wherein R$^{19}$ to R$^{30}$ may be same or different and each denotes an organic group having 1 to 12 carbon atoms.

Further, the nonaqueous electrolyte battery of the invention is characterized in that the nonaqueous electrolyte contains a chain carbonate at a ratio higher than 70 volume % in the entire volume of the nonaqueous solvent and satisfies 0<a<30, wherein "a" denotes the volume of a cyclic carbonate among carbonates having no carbon-carbon double bond in the entire volume, defined as 100, of the carbonates having no carbon-carbon double bond in the nonaqueous solvent.

The nonaqueous electrolyte battery of the invention is characterized in that the nonaqueous electrolyte contains a chain carbonate at a ratio of 90 volume % or higher in the entire volume of the nonaqueous solvent and satisfies 0<a≦10, wherein "a" denotes the volume of a cyclic carbonate among carbonates having no carbon-carbon double bond in the entire volume, defined as 100, of the carbonates having no carbon-carbon double bond in the nonaqueous solvent.

The nonaqueous electrolyte battery of the invention is characterized in that the nonaqueous electrolyte contains the chain carbonate and the chain carboxylate at a ratio higher than 70 volume % in the entire volume of the nonaqueous solvent and satisfies 0≦b<30, wherein "b" denotes the volume of a cyclic carbonate among carbonates having no carbon-carbon double bond in the entire volume, defined as 100, of the carbonates having no carbon-carbon double bond and chain carboxylates in the nonaqueous solvent.

The nonaqueous electrolyte battery of the invention is characterized in that the nonaqueous electrolyte contains the chain carboxylate at a ratio higher than 90 volume % in the entire volume of the nonaqueous solvent and satisfies 0≦c<10, wherein "c" denotes the volume of a cyclic carbonate among carbonates having no carbon-carbon double bond in the entire volume, defined as 100, of the carbonates having no carbon-carbon double bond and chain carboxylates in the nonaqueous solvent.

Further, the nonaqueous electrolyte battery of the invention is characterized in that the negative electrode contains spinel type lithium titanate.

The nonaqueous electrolyte battery of the invention is provided with a negative electrode with an operating potential of 1.2 V (vs. Li/Li$^+$) or higher as one of characteristics. Herein, "a negative electrode with an operating potential of 1.2 V (vs. Li/Li$^+$) or higher" means a negative electrode operated at a potential of 1.2 V or higher based on the potential of metal lithium when charge and discharge are carried out in the nonaqueous electrolyte battery. To say that the nonaqueous electrolyte battery is provided with a negative electrode with an operating potential of 1.2 V (vs. Li/Li$^+$) or higher, it is of course required that the nonaqueous electrolyte battery practically works as a battery at a potential of 1.2 V or higher of the negative electrode. For example, in the case a battery using graphite for a negative electrode is put into an overdischarged state, even if the negative electrode potential is increased to 1.2 V or higher, the dischargeable capacity in a region of the negative electrode potential of 1.2 V or higher is 0 (zero) or almost equal to 0 and therefore, such a battery cannot be said to be the battery having a negative electrode practically operating at a potential of 1.2 V or higher to the lithium potential and is excluded from the scope of the invention. In the invention, to say that a negative electrode with an operating potential of 1.2 V (vs. Li/Li$^+$) or higher is installed, when discharge is carried out in a condition in which a battery is commonly used, it is practically supposed that at least 50% of the discharge capacity is obtained corresponding to the negative electrode operation region with a negative electrode potential of 1.2 V or higher.

A negative electrode having an operating potential of 1.2 V (vs. Li/Li$^+$) or higher can be achieved by, for example, providing a negative electrode containing a negative active material for inserting/extracting the lithium ion at a potential of 1.2 V or higher to the lithium potential. Examples of the negative active material for inserting/extracting the lithium ion at a potential of 1.2 V or higher to the lithium potential include tungsten oxide, molybdenum oxide, iron sulfide, titanium sulfide, and lithium titanate. Particularly, lithium titanate having a spinel type structure, defined by the chemical formula Li$_{4+x}$Ti$_5$O$_{12}$ (0≦x≦3), is preferable. Herein, a portion of Ti may be substituted with other elements. Lithium titanate substituted with Al or Mg at a specified ratio is preferable, since the flatness of potential and high-rate discharge performance can be improved.

The nonaqueous electrolyte battery of the invention is characterized in that the battery contains a compound defined by a general formula (1), (2), or (3). That is, one kind of compound selected from a group of compounds defined by the general formulas (1) to (3) may be used or two or more of the compounds may be used simultaneously.

In the general formulas (1) to (3), R may be same or different and each denotes an organic group having 1 to 12 carbon atoms. Examples thereof include chain alkyl groups such as a methyl group, an ethyl group, an n-propyl group, an isopropyl group, a butyl group, and an isobutyl group; cyclic alkyl groups such as a cyclohexyl group; alkenyl groups such as a vinyl group and an allyl group; alkyl halide groups such as a trifluoromethyl group; trialkylsilyl groups such as a trimethylsilyl group; and trialkylsiloxy groups such as a trimethylsiloxy group.

The ratio of the compounds defined by the general formulas (1) to (3) is preferably 10 ppm (0.001 mass %) or higher, more preferably 0.01 mass % or higher, and even more preferably 0.1 mass % or higher in total in the entire nonaqueous electrolyte. Further, although the upper limit differs depending on the compounds used, the upper limit is preferably 5 mass % or lower and more preferably 3 mass % or lower.

When the specified compounds defined by the general formulas (1) to (3) are added to a nonaqueous electrolyte and used actually for producing a secondary battery, even if the battery is disassembled and the nonaqueous electrolyte is taken out, the contents of the compounds are often considerably decreased. A battery in which at least the specified compounds can be detected from the nonaqueous electrolyte taken out of the battery is supposed to be within the technical scope of the invention.

In the case the nonaqueous electrolyte to be used in the nonaqueous electrolyte battery of the invention contains a chain carbonate as a main solvent (at a ratio higher than 70 volume % in the entire volume of the nonaqueous solvent), it is preferable that $0<a<30$ is satisfied, wherein a denotes the volume of a cyclic carbonate among carbonates having no carbon-carbon double bond in the entire volume, defined as 100, of the carbonates having no carbon-carbon double bond in the nonaqueous solvent. The value of a, showing the volume ratio of a cyclic carbonate in the volume of carbonates having no carbon-carbon double bond in the case the volume of the carbonates having no carbon-carbon double bond is defined as 100, is further preferably 10 or lower in order to make the low-temperature-output performance after high-temperature-storage more excellent. Further, to suppress self-discharge in high-temperature-storage, the value of a is preferably 1 or higher. Herein, examples of the cyclic carbonate include ethylene carbonate (EC), propylene carbonate (PC), and butylene carbonate (BC).

In the case a chain carboxylate is contained as a main solvent, it is preferable that $0 \leq b < 30$ is satisfied, wherein b denotes the volume of a cyclic carbonate among carbonates having no carbon-carbon double bond in the entire volume, defined as 100, of the carbonates having no carbon-carbon double bond and chain carboxylates in the nonaqueous solvent. In order to make the low-temperature-output performance after high-temperature-storage more excellent, it is preferable that the ratio of the chain carboxylate is higher than 90 volume % and the value of b is lower than 10. Even if the ratio of the cyclic carbonate is 0, a significant effect can be obtained.

As a carbonate, which has no carbon-carbon double bond, contained in the nonaqueous solvent, it is preferable to use a chain carbonate as a main solvent mixed with a small amount of a cyclic carbonate. As the chain carbonate, methyl ethyl carbonate may be used alone; however, to make the low-temperature-output performance excellent, dimethyl carbonate is preferably mixed and used. In the case the volume of carbonates, which has no carbon-carbon double bond, contained in the nonaqueous solvent is defined as 100, the ratio of dimethyl carbonate in the volume of carbonates is preferably 10 or higher and more preferably 20 or higher. However, if it is 60 or higher, the low-temperature-output performance is lowered and therefore it is required to be lower than 60 and preferably 50 or lower.

Effects of the Invention

According to the present invention, a nonaqueous electrolyte battery provided with low-temperature-output performance after high-temperature-storage is obtained.

BEST MODE FOR CARRYING OUT THE INVENTION

A nonaqueous electrolyte to be used in the battery of the invention may contain solvents other than the solvents specifically exemplified above and may contain, for example, cyclic esters such as γ-butyrolactone and γ-valerolactone; chain esters such as methyl acetate, ethyl acetate, propyl acetate, and methyl propylene; cyclic ethers such as tetrahydrofuran, 2-methyltetrahydrofuran, and tetrahydropyran; sulfolane, acetonitrile, and various kinds of ionic liquids.

A solvent of the nonaqueous electrolyte to be used for the battery of the invention may contain a carbonate having a carbon-carbon double bond besides a carbonate having no carbon-carbon double bond. Particularly, it is preferable to contain vinylene carbonate, a cyclic carbonate having a carbon-carbon double bond, in a ratio of 10 mass % or lower in the entire nonaqueous electrolyte, since an excellent effect of suppressing gas evolution in an initial charge-discharge process has been proved.

An electrolytic salt to be used for the nonaqueous electrolyte is not particularly limited as long as it is a lithium salt which is known to be used as an electrolytic salt for a nonaqueous electrolyte battery. Examples thereof include inorganic fluoride salts such as lithium hexafluorophosphate ($LiPF_6$), lithium tetrafluoroborate ($LiBF_4$), and lithium hexafluoroarsenate ($LiAsF_6$); perhalogen acid salts such as lithium perchlorate ($LiClO_4$); and fluorine-containing organic lithium salts such as lithium trifluoromethanesulfonate ($LiCF_3SO_3$) and bistrifluoromethylsulfonylimide lithium [$LiN(CF_3SO_2)_2$]. These electrolytic salts may be used alone or two or more of them may be used in an arbitrary combination and ratio.

Examples of a separator include porous films containing polyethylene, polypropylene, cellulose, or poly(vinylidene fluoride) (PVdF) and synthetic resin nonwoven fabrics.

As a negative electrode current collector, those having resistance to the nonaqueous electrolyte to be used and resistance to an electrochemical reaction on the negative electrode may be used. Examples thereof include nickel, copper, stainless steel, and aluminum.

As a positive active material usable for a positive electrode installed in the nonaqueous electrolyte battery of the invention, those which can carry out electrochemical insertion/extraction of the lithium ion can be used without any limitation and various kinds of oxides and sulfides can be used.

Examples thereof include manganese dioxide ($MnO_2$), iron oxide, copper oxide, nickel oxide, a lithium-manganese composite oxide (e.g. $Li_xMn_2O_4$ or $Li_xMnO_2$), a lithium-nickel composite oxide (e.g. $Li_xNiO_2$), a lithium-cobalt composite oxide ($Li_xCoO_2$), a lithium-nickel-cobalt composite oxide ($LiNi_xCo_{1-x}O_2$), a lithium-nickel-cobalt-manganese composite oxide ($LiNi_xCo_yMn_{1-x-y}O_2$), a spinel type lithium-manganese-nickel composite oxide ($LiMn_{2-y}Ni_xO_4$), a lithium phosphate having an olivine structure (e.g., $LiFePO_4$, $LiCoPO_4$, $LiVPO_4$, $LiVPO_4F$, $LiMnPO_4$, $LiMn_{7/8}Fe_{1/8}PO_4$, $LiNiVO_4$, $Li_3V_2(PO_4)_3$, $LiFeP_2O_7$, $Li_3Fe_2(PO_4)_3$, $Li_2CoSiO_4$, $Li_2MnSiO_4$, $Li_2FeSiO_4$, $LiTePO_4$, or the like), iron sulfate ($Fe_2(SO_4)_3$), and a vanadium oxide (e.g. $V_2O_5$). Further, portions of metal atoms as main components of these substances may be substituted with other elements such as Al, Ti, V, Cr, Mn, Fe, Co, Li, Ni, Cu, Zn, Mg, Ga, Zr, and Si. Furthermore, examples of the positive active material also include conductive polymer materials such as polyaniline and polypyrrole; and organic materials and inorganic materials such as disulfide-based polymer materials, sulfur (S), and fluorocarbon.

A publicly-known conductive material and a binder may be contained in the positive electrode by applying and mixing by a publicly-known method. Examples of a conductive agent include acetylene black, carbon black, and graphite. Examples of the binder include polytetrafluoroethylene (PTFE), poly(vinylidene fluoride) (PVdF), and a fluoro-rubber. A publicly-known material may be used by a publicly-known method for a positive electrode current collector. Examples thereof include aluminum and an aluminum alloy.

Hereinafter, the present invention will be described more specifically with reference to examples and comparative examples; however, it is not intended that the present invention be limited to the illustrated examples unless departing from the spirit and scope of the present invention.

Example 1

<<Production of Electrolyte Solution>>

The following compositions were used for the nonaqueous electrolyte.

A1: 1.2 M $LiPF_6$MEC (comparative example)
A2: 1.2 M $LiPF_6$MEC+1 wt. % of trimethylsilyl methanesulfonate (comparative example)
A3: 1.2 M $LiPF_6$MEC+1 wt. % of TMSP (comparative example)
A4: 1.2 M $LiPF_6$MEC+1 wt. % of TMSB (comparative example)
A5: 1.2 M $LiPF_6$MEC+1 wt. % of TMST (comparative example)
B1: 1.2 M $LiPF_6$EC:MEC=1:99 (vol. %) (comparative example)
B2: 1.2 M $LiPF_6$EC:MEC=1:99 (vol. %)+1 wt. % of trimethylsilyl methanesulfonate (comparative example)
B3: 1.2 M $LiPF_6$EC:MEC=1:99 (vol. %)+1 wt. % of TMSP (example)
C1: 1.2 M $LiPF_6$EC:MEC=2:98 (vol. %) (comparative example)
C2: 1.2 M $LiPF_6$EC:MEC=2:98 (vol. %)+1 wt. % of trimethylsilyl methanesulfonate (comparative example)
C3: 1.2 M $LiPF_6$EC:MEC=2:98 (vol. %)+1 wt. % of TMSP (example)
D1: 1.2 M $LiPF_6$EC:MEC=5:95 (vol. %) (comparative example)
D2: 1.2 M $LiPF_6$EC:MEC=5:95 (vol. %)+1 wt. % of trimethylsilyl methanesulfonate (comparative example)
D3: 1.2 M $LiPF_6$EC:MEC=5:95 (vol. %)+1 wt. % of TMSP (example)
E1: 1.2 M $LiPF_6$EC:MEC=10:90 (vol. %) (comparative example)
E2: 1.2 M $LiPF_6$EC:MEC=10:90 (vol. %)+1 wt. % of trimethylsilyl methanesulfonate (comparative example)
E3: 1.2 M $LiPF_6$EC:MEC=10:90 (vol. %)+1 wt. % of TMSP (example)
F1: 1.2 M $LiPF_6$EC:MEC=30:70 (vol. %) (comparative example)
F2: 1.2 M $LiPF_6$EC:MEC=30:70 (vol. %)+1 wt. % of trimethylsilyl methanesulfonate (comparative example)
F3: 1.2 M $LiPF_6$EC:MEC=30:70 (vol. %)+1 wt. % of TMSP (example)
F4: 1.2 M $LiPF_6$EC:MEC=30:70 (vol. %)+1 wt. % of TMSB (example)
F5: 1.2 M $LiPF_6$EC:MEC=30:70 (vol. %)+1 wt. % of TMST (example)
G1: 1.2 M $LiPF_6$PC:MEC=2:98 (vol. %) (comparative example)
G2: 1.2 M $LiPF_6$PC:MEC=2:98 (vol. %)+1 wt. % of trimethylsilyl methanesulfonate (comparative example)
G3: 1.2 M $LiPF_6$PC:MEC=2:98 (vol. %)+1 wt. % of TMSP (example)
H1: 1.2 M $LiPF_6$EC:MEC:DMC=10:60:30 (vol. %) (comparative example)
H2: 1.2 M $LiPF_6$EC:MEC:DMC=10:60:30 (vol. %)+1 wt. % of TMSP (example)
I1: 1.2 M $LiPF_6$EC:MEC:DEC=10:60:30 (vol. %) (comparative example)
I2: 1.2 M $LiPF_6$EC:MEC:DEC=10:60:30 (vol. %)+1 wt. % of TMSP (example)
J1: 1.2 M $LiPF_6$EC:GBL:DEC=1:1:4 (vol. %)+1 wt. % of TMSP (comparative example)
K1: 1.2 M $LiPF_6$EC:MEC=20:80 (vol. %)+1 wt. % of TMSP (example)

<<Production of Positive Electrode>>

After a positive electrode slurry containing 91 parts by mass of a lithium-transition metal composite oxide ($LiNi_{1/6}Mn_{1/6}Co_{2/3}O_2$) powder having a hexagonal rock salt type crystal structure as a positive active material, 4.5 parts by mass of acetylene black as a conductive material, and 4.5 parts by mass of poly(vinylidene fluoride) (PVdF) as a binder in N-methylpyrrolidone (NMP) as a solvent was applied to the each surface of a positive electrode current collector (made of aluminum, thickness 20 μm) to become 9 mg/cm² of the electrode composite amount (excluding the current collector), the positive electrode current collector was dried and pressed to adjust the electrode thickness to be 82 μm (including the current collector) to obtain a positive electrode.

<<Production of Negative Electrode>>

After a negative electrode slurry containing 87 parts by mass of a spinel type lithium titanate ($Li_4Ti_5O_{12}$) powder as a negative active material, 5 parts by mass of acetylene black as a conductive material, and 8 parts by mass of poly(vinylidene fluoride) (PVdF) as a binder in N-methylpyrrolidone (NMP) as a solvent was applied to the each surface of a negative electrode current collector (made of copper, thickness 10 μm) to be 9 mg/cm² of the electrode composite amount (excluding the current collector), the negative electrode current collector was dried and pressed to adjust the electrode thickness to be 110 μm (including the current collector) to obtain a negative electrode.

<<Production of Battery>>

A rolled and flattened electrode unit obtained by rolling the positive electrode and the negative electrode interposing a porous separator made of polyethylene (manufactured by Asahi Kasei: product No. H6022) was set in a square container can made of aluminum (height 49.3 mm; width 33.7 mm; thickness 5.17 mm) and 3.5 g of the nonaqueous electrolyte was injected under reduced pressure, then the container can was sealed and kept at 25° C. overnight.

<<Measurement of Battery Capacity>>

Next, the obtained battery was subjected to an initial charge-discharge process. The conditions of the initial charge-discharge process were a temperature of 25° C., a charge current of 40 mA, a charge voltage of 2.5 V, a total charge time of 20 hours, a discharge current of 80 mA, and an end-of-discharge voltage of 1.0 V. The positive electrode potential of the battery in the terminal period with the end-of-charge voltage of 2.5 V was about 4.0 V to the lithium potential and the negative electrode potential was about 1.5 V to the lithium potential. After charge and after discharge, a 10 minute-pausing period was set and after one cycle of the above-mentioned charge-discharge process, two cycles of a charge-discharge process under conditions of a charge current of 400 mA, a charge voltage of 2.5 V, a total charge time of 3 hours, a discharge current of 400 mA, and an end-of-discharge voltage of 1.0 V were carried out. The 1 C discharge capacity at the second cycle was defined as the initial capacity.

<<Evaluation of Output Performance>>

After constant current and constant voltage charge was carried out with a charge current of 400 mA, a charge voltage of 2.5 V, and a total charge time of 3 hours under 25° C., the battery was cooled by keeping it under a −30° C. temperature environment for 5 hours or longer. Thereafter, discharge was carried out for 10 seconds at current values of 400, 800, 1200, and 1600 mA and the voltage at 10 seconds was measured. After each discharge, a 1-hour pause, charge with the same electricity as that of the adjacent discharge at the same current value under the same temperature environment, and further a 1-hour pause were set. By this operation, the state before discharge was constantly kept to be SOC 100%.

From a graph of current-voltage characteristics obtained by plotting the voltage after 10 seconds from starting discharge in the ordinate axis and the discharge current value in the abscissa axis, the DCR (direct current resistance) value which is a value corresponding to the inclination was calculated and at the same time, the voltage $E_0$ was calculated by extrapolating the current value 0 (zero) in the graph and assuming that the end-of-discharge voltage to be 1.5 V, the output value $W_{out}$ was calculated.

$$V = E_0 + IR (R<0)$$

$$W_{out} = I \times V = (1.5 - E_0)/R \times 1.5$$

<<80° C. Storage Test>>

A battery subjected to the low-temperature-output performance test was charged by constant current and constant voltage charge under conditions of a charge current of 400 mA, a charge voltage of 2.5 V, and a total charge time of 3 hours. The battery was stored in a thermostat bath at 80° C. for 4 days, taken out and thereafter cooled at 25° C. for 5 hours or longer. Then the thickness of the center part of the battery was measured and the low-temperature-output performance was evaluated.

In the above-mentioned manner, battery capacity, the thickness of the battery after storage, and the output performance before and after storage were measured and calculated for each of batteries produced by using the electrolyte solutions A1 to K1. The thickness of the battery after storage, the output performance before and after storage, and its retention rate are shown in Table 1. The abbreviations of the electrolyte solutions and additives are as follows.

PC: propylene carbonate
EC: ethylene carbonate
MEC: methyl ethyl carbonate
DMC: dimethyl carbonate
DEC: diethyl carbonate
GBL: γ-butyrolactone
TMSP: tris(trimethylsilyl)phosphate
TMSB: tris(trimethylsilyl)borate
TMST: tetrakis(trimethylsiloxy)titanium

TABLE 1

| Electrolyte solution No. | Type of nonaqueous solvent | Additive | Thickness of battery/mm | Output performance at −30° C. | | |
|---|---|---|---|---|---|---|
| | | | | Before storage/W | After storage/W | Retention rate/% |
| A1 | MEC | control | 6.6 | 4.9 | — | — |
| A2 | | Trimethylsilyl methanesulfonate | 5.6 | 5.5 | — | — |
| A3 | | TMSP | 5.7 | 5.5 | — | — |
| A4 | | TMSB | 6.7 | 6.6 | — | — |
| A5 | | TMST | 5.9 | 6.6 | — | — |
| B1 | EC:MEC = 1:99 | control | 7.5 | 4.9 | 3.4 | 69 |
| B2 | | Trimethylsilyl methanesulfonate | 8.0 | 5.9 | 2.4 | 41 |
| B3 | | TMSP | 7.0 | 4.8 | 5.0 | 104 |
| C1 | EC:MEC = 2:98 | control | 7.5 | 4.8 | 3.7 | 77 |
| C2 | | Trimethylsilyl methanesulfonate | 7.0 | 5.5 | 4.5 | 82 |
| C3 | | TMSP | 7.2 | 4.8 | 4.9 | 102 |
| D1 | EC:MEC = 5:95 | control | 7.1 | 5.0 | 3.9 | 80 |
| D2 | | Trimethylsilyl methanesulfonate | 6.8 | 5.3 | 4.6 | 87 |
| D3 | | TMSP | 7.2 | 4.6 | 4.8 | 105 |
| E1 | EC:MEC = 10:90 | control | 7.5 | 4.5 | 3.5 | 76 |
| E2 | | Trimethylsilyl methanesulfonate | 7.0 | 5.2 | 4.2 | 82 |
| E3 | | TMSP | 7.2 | 4.5 | 4.6 | 102 |
| F1 | EC:MEC = 30:70 | control | 7.7 | 4.1 | 2.5 | 60 |
| F2 | | Trimethylsilyl methanesulfonate | 6.9 | 5.0 | 3.5 | 69 |
| F3 | | TMSP | 7.5 | 4.2 | 3.3 | 79 |
| F4 | | TMSB | 6.8 | 5.2 | 5.1 | 99 |
| F5 | | TMST | 6.6 | 5.8 | 4.8 | 83 |
| G1 | PC:MEC = 2:98 | control | 7.8 | 4.8 | 3.3 | 70 |
| G2 | | Trimethylsilyl methanesulfonate | 8.5 | 5.4 | 1.6 | 29 |
| G3 | | TMSP | 7.5 | 4.6 | 4.8 | 105 |

TABLE 1-continued

| Electrolyte solution No. | Type of nonaqueous solvent | Additive | Thickness of battery/mm | Output performance at −30° C. | | |
|---|---|---|---|---|---|---|
| | | | | Before storage/W | After storage/W | Retention rate/% |
| H1 | EC:MEC:DMC = | control | 7.6 | 5.5 | 3.7 | 67 |
| H2 | 10:60:30 | TMSP | 7.2 | 5.2 | 5.0 | 95 |
| I1 | EC:MEC:DEC = | control | 7.1 | 5.2 | 3.3 | 64 |
| I2 | 10:60:30 | TMSP | 6.8 | 5.0 | 4.5 | 92 |
| J1 | EC:GBL:DEC = 1:1:4 | TMSP | 6.8 | 4.6 | 2.4 | 52 |
| K1 | EC:MEC = 20:80 | TMSP | 7.8 | 4.3 | 3.6 | 83 |

As shown in Table 1, batteries containing nonaqueous electrolytes containing trimethylsilyl methanesulfonate as an additive showed an excellent output performance as compared with those containing no additive in terms of the initial performance. However, in the low-temperature-output test carried out after a storage test at 80° C. for 4 days, as shown in F1 to F5, in the case of containing 70 volume % of a chain carbonate as a main solvent in the entire volume of the nonaqueous solvent, the batteries containing TMSP, TMSB, and TMST showed high output retention rates; in contrast, the output retention rate of the battery containing trimethylsilyl methanesulfonate was low. Further, as shown in B1 to E3, G1 to G3, and H1 to I2, with respect to the batteries containing TMSP, in the case the ratio of the cyclic carbonates in the nonaqueous electrolytes was 10 volume % or lower (the ratio of the chain carbonate was 90 volume % or higher), the output retention rates were remarkably improved as compared with those of the case of F3 where the ratio of the cyclic carbonate was 30 volume % (the ratio of the chain carbonate was 70 volume %) and the case of K1 where the ratio of the cyclic carbonate was 20 volume % (the ratio of the chain carbonate was 80 volume %). Particularly, in the case of B3, C3, D3, and E3, it was an astonishing result that the low-temperature-output performance was not at all lowered even after storage under a high temperature environment of 80° C. In addition, the battery of J1 not containing the chain carbonate at a ratio of 70 volume % or higher in the entire nonaqueous solvent did not show improvement of the output retention rate. Based on these results, the ratio of a chain carbonate as a main solvent is preferably more than 70 volume % in the entire nonaqueous solvent and the ratio of a cyclic carbonate is preferably less than 30 volume % in the entire volume of the carbonates having no carbon-carbon double bond (in examples, the entire volume of the nonaqueous solvent). The ratio of a chain carbonate is more preferably 90 volume % or higher in the entire volume of the nonaqueous solvent and the ratio of a cyclic carbonate is more preferably 10 volume % or less in the entire volume of the carbonates having no carbon-carbon double bond. However, in the case of employing nonaqueous electrolytes A1 to A5 in which the ratios of the chain carbonates were 100 volume %, the battery voltage was lowered to 0 V after storage at 80° C. for 4 days and no battery capacity was taken out. Consequently, a nonaqueous electrolyte battery containing 100 volume % of a chain carbonate is excluded from the invention.

Example 2

<<Production of Electrolyte Solution>>

The following compositions were used for the nonaqueous electrolyte.

L1: 1.2 M LiPF$_6$MA (comparative example)
L2: 1.2 M LiPF$_6$MA+1 wt. % of TMST (example)
L3: 1.2 M LiPF$_6$MA+1 wt. % of TMSB (example)
L4: 1.2 M LiPF$_6$MA+1 wt. % of TMSP (example)
M1: 1.2 M LiPF$_6$MA:EC=98:2 (vol. %) (comparative example)
M2: 1.2 M LiPF$_6$MA:EC=98:2 (vol. %)+1 wt. % of TMST (example)
N1: 1.2 M LiPF$_6$MA:EC=95:5 (vol. %) (comparative example)
N2: 1.2 M LiPF$_6$MA:EC=95:5 (vol. %)+1 wt. % of TMST (example)
O1: 1.2 M LiPF$_6$MA:EC=90:10 (vol. %) (comparative example)
O2: 1.2 M LiPF$_6$MA:EC=90:10 (vol. %)+1 wt. % of TMST (example)
P1: 1.2 M LiPF$_6$MA:MEC=90:10 (vol. %) (comparative example)
P2: 1.2 M LiPF$_6$MA:MEC=90:10 (vol. %)+1 wt. % of TMST (example)
Q1: 1.2 M LiPF$_6$MA:EC=30:70 (vol. %) (comparative example)
Q2: 1.2 M LiPF$_6$MA:EC=30:70 (vol. %)+1 wt. % of TMST (example)
R1: 1.2 M LiPF$_6$MA:EC:MEC=10:20:70 (vol. %) (comparative example)
R2: 1.2 M LiPF$_6$MA:EC:MEC=10:20:70 (vol. %)+1 wt. % of TMST (example)
S1: 1.2 M LiPF$_6$MA:EC:MEC=30:20:50 (vol. %) (comparative example)
S2: 1.2 M LiPF$_6$MA:EC:MEC=30:20:50 (vol. %)+1 wt. % of TMST (example)
T1: 1.2 M LiPF$_6$MA:EC:MEC=50:10:40 (vol. %) (comparative example)
T2: 1.2 M LiPF$_6$MA:EC:MEC=50:10:40 (vol. %)+1 wt. % of TMST (example)

<Production of Battery Having Lithium Titanate Negative Electrode>

<<Production of Positive Electrode>>

After a positive electrode slurry containing 91 parts by mass of a lithium-transition metal composite oxide (LiNi$_{1/6}$Mn$_{1/6}$Co$_{2/3}$O$_2$) powder having a hexagonal rock salt type crystal structure as a positive active material, 4.5 parts by mass of acetylene black as a conductive material, and 4.5 parts by mass of poly(vinylidene fluoride) (PVdF) as a binder in N-methylpyrrolidone (NMP) as a solvent was applied to the each surface of a positive electrode current collector (made of aluminum, thickness 20 μm) to become 8.8 mg/cm$^2$ of the electrode composite amount (excluding the current collector), the positive electrode current collector was dried and pressed to adjust the electrode thickness to be 81 μm (including the current collector) to obtain a positive electrode.

<<Production of Negative Electrode>>

After a negative electrode slurry containing 87 parts by mass of a spinel type lithium titanate (Li$_4$Ti$_5$O$_{12}$) powder as a negative active material, 5 parts by mass of acetylene black as a conductive material, and 8 parts by mass of poly(vinylidene fluoride) (PVdF) as a binder in N-methylpyrrolidone (NMP) as a solvent was applied to the each surface of a negative electrode current collector (made of aluminum, thickness 20 µm) to become 7.3 mg/cm² of the electrode composite amount (excluding the current collector), the negative electrode current collector was dried and pressed to adjust the electrode thickness to be 99 µm (including the current collector) to obtain a negative electrode.

<<Production of Battery>>

A rolled and flattened electrode unit obtained by rolling the positive electrode and the negative electrode interposing a porous separator made of polyethylene (manufactured by Asahi Kasei: product No. H6022) was set in a square container can made of aluminum (height 49.3 mm; width 33.7 mm; thickness 5.17 mm) and 2.8 g of the nonaqueous electrolyte was injected under reduced pressure, then the container can was sealed and kept at 25° C. overnight.

<<Measurement of Battery Capacity>>

Next, the obtained battery was subjected to an initial charge-discharge process. The conditions of the initial charge-discharge process were a temperature of 25° C., a charge current of 80 mA, a charge voltage of 2.5 V, a total charge time of 8 hours, a discharge current of 80 mA, and an end-of-discharge voltage of 1.0 V. The positive electrode potential of the battery in the terminal period with the end-of-charge voltage of 2.5 V was about 4.0 V to the lithium potential and the negative electrode potential was about 1.55 V to the lithium potential. After charge and after discharge, a 10 minute-pausing period was set and after one cycle of the above-mentioned charge-discharge process, two cycles of a charge-discharge process under conditions of a charge current of 400 mA, a charge voltage of 2.5 V, a total charge time of 3 hours, a discharge current of 400 mA, and an end-of-discharge voltage of 1.0 V were carried out. The 1 C discharge capacity at the second cycle was defined as the initial capacity.

<<Evaluation of Output Performance>>

After constant current and constant voltage charge was carried out with a charge current of 400 mA, a charge voltage of 2.5 V, and a total charge time of 3 hours under 25° C., the battery was cooled by keeping it under a −30° C. temperature environment for 5 hours or longer. Thereafter, discharge was carried out for 10 seconds at current values of 400, 800, 1200, and 1600 mA and the voltage at 10 seconds was measured. After each discharge, a 1-hour pause, charge with the same electricity as that of the adjacent discharge at the same current value under the same temperature environment, and further a 1-hour pause were set. By this operation, the state before discharge was constantly kept to be a fully charged state.

From a graph of current-voltage characteristics obtained by plotting the voltage after 10 seconds from starting discharge in the ordinate axis and the discharge current value in the abscissa axis, the DCR (direct current resistance) value which is a value corresponding to the inclination was calculated and at the same time, the voltage $E_0$ was calculated by extrapolating the current value 0 (zero) in the graph and assuming that the end-of-discharge voltage to be 1.5 V, the output value $W_{out}$ was calculated.

$$V = E_0 + IR (R<0)$$

$$W_{out} = I \times V = (1.5 - E_0)/R \times 1.5$$

<<60° C. Storage Test>>

A battery having a lithium titanate negative electrode subjected to the low-temperature-output performance test was charged by constant current and constant voltage charge under conditions of a charge current of 400 mA, a charge voltage of 2.5 V, and a total charge time of 3 hours. The battery was stored in a thermostat bath at 60° C. for 15 days, taken out and thereafter cooled at 25° C. for 5 hours or longer. Then the thickness of the center part of the battery was measured and the output performance at low temperature was evaluated.

<Production of Battery Having Carbon Material Negative Electrode>

<<Production of Positive Electrode>>

After a positive electrode slurry containing 91 parts by mass of a lithium-transition metal composite oxide ($LiNi_{1/6}Mn_{1/6}Co_{2/3}O_2$) powder having a hexagonal rock salt type crystal structure as a positive active material, 4.5 parts by mass of acetylene black as a conductive material, and 4.5 parts by mass of poly(vinylidene fluoride) (PVdF) as a binder in N-methylpyrrolidone (NMP) as a solvent was applied to the each surface of a positive electrode current collector (made of aluminum, thickness 20 µm) to become 14.6 mg/cm² of the electrode composite amount (excluding the current collector), the positive electrode current collector was dried and pressed to adjust the electrode thickness to be 118 µm (including the current collector) to obtain a positive electrode.

<<Production of Negative Electrode>>

After a negative electrode slurry containing 95 parts by mass of Carbotron P powder, a carbon material, as a negative active material, and 5 parts by mass of poly(vinylidene fluoride) (PVdF) as a binder in N-methylpyrrolidone (NMP) as a solvent was applied to the each surface of a negative electrode current collector (made of copper, thickness 10 µm) to be 6.2 mg/cm² of the electrode composite amount (excluding the current collector), the negative electrode current collector was dried and pressed to adjust the electrode thickness to be 141 µm (including the current collector) to obtain a negative electrode.

<<Production of Battery>>

A rolled and flattened electrode unit obtained by rolling the positive electrode and the negative electrode interposing a porous separator made of polyethylene (manufactured by Asahi Kasei: product No. H6022) was set in a square container can made of aluminum (height 49.3 mm; width 33.7 mm; thickness 5.17 mm) and 2.8 g of the nonaqueous electrolyte was injected under reduced pressure, then the container can was sealed and kept at 25° C. overnight.

<<Measurement of Battery Capacity>>

Next, the obtained battery was subjected to an initial charge-discharge process. The conditions of the initial charge-discharge process were a temperature of 25° C., a charge current of 80 mA, a charge voltage of 4.03 V, a total charge time of 8 hours, a discharge current of 80 mA, and an end-of-discharge voltage of 2.25 V. The positive electrode potential of the battery in the terminal period with the end-of-charge voltage of 4.03 V was about 4.05 V to the lithium potential and the negative electrode potential was about 0.02 V to the lithium potential. After charge and after discharge, a 10 minute-pausing period was set and after one cycle of the above-mentioned charge-discharge process, two cycles of a charge-discharge process under conditions of a charge current of 400 mA, a charge voltage of 4.03 V, a total charge time of 3 hours, a discharge current of 400 mA, and an end-of-discharge voltage of 2.25 V were carried out. The 1 C discharge capacity at the second cycle was defined as the initial capacity.

<<Evaluation of Output Performance>>

After constant current and constant voltage charge was carried out with a charge current of 400 mA, a charge voltage of 4.03 V, and a total charge time of 3 hours under 25° C., the battery was cooled by keeping it under a −30° C. temperature environment for 5 hours or longer. Thereafter, discharge was carried out for 10 seconds at current values of 400, 800, 1200, and 1600 mA and the voltage at 10 seconds was measured. After each discharge, a 1-hour pause, charge with the same electricity as that of the adjacent discharge at the same current value under the same temperature environment, and further a 1-hour pause were set. By this operation, the state before discharge was constantly kept to be a fully charged state.

From a graph of current-voltage characteristics obtained by plotting the voltage after 10 seconds from starting discharge in the ordinate axis and the discharge current value in the abscissa axis, the DCR (direct current resistance) value which is a value corresponding to the inclination was calculated and at the same time, the voltage $E_0$ was calculated by extrapolating the current value 0 (zero) in the graph and assuming that the end-of-discharge voltage to be 2.25 V, the output value $W_{out}$ was calculated.

$$V = E_0 + IR (R<0)$$

$$W_{out} = I \times V = (1.5 - E_0)/R \times 2.25$$

<<60° C. Storage Test>>

A battery having a carbon material negative electrode subjected to the low temperature output performance test was charged by constant current and constant voltage charge under conditions of a charge current of 400 mA, a charge voltage of 4.03 V, and a total charge time of 3 hours. The battery was stored in a thermostat bath at 60° C. for 15 days, taken out and thereafter cooled at 25° C. for 5 hours or longer. Then the thickness of the center part of the battery was measured and the low-temperature-output performance was evaluated.

In the above-mentioned manner, the battery capacity, the thickness of the battery after storage, and the output performance before and after storage were measured and calculated for each of the batteries having the lithium titanate negative electrode and produced by using the electrolyte solutions L1 to T2. Further, the battery capacity, the thickness of the battery after storage, and the output performance before and after storage were measured and calculated for each of the batteries having the carbon material negative electrode and produced by using the electrolyte solutions L1' to O2' which are the same electrolyte solutions as L1 to O2. The battery capacity, the thickness of the battery after storage, the output performance before and after storage, and its retention rate are shown in Table 2. The abbreviations of the negative electrode and the electrolyte solutions are same as those in Example 1, except the following.

$Li_4Ti_5O_{12}$: Lithium titanate

CTP: Carbotron P

MA: Methyl acetate

TABLE 2

| Electrolyte solution No. | Negative electrode | MA | EC | MEC | Additive | Output before storage/W | Output after storage/W | Retention rate/% | Thickness of battery after storage/mm |
|---|---|---|---|---|---|---|---|---|---|
| L1 | $Li_4Ti_5O_{12}$ | 100 | | | | 17.5 | 7.7 | 44 | 7.4 |
| L2 | $Li_4Ti_5O_{12}$ | 100 | | | TMST | 17.8 | 14.5 | 81 | 6.2 |
| L3 | $Li_4Ti_5O_{12}$ | 100 | | | TMSB | 15.6 | 15.9 | 102 | 5.9 |
| L4 | $Li_4Ti_5O_{12}$ | 100 | | | TMSP | 12.3 | 10.5 | 85 | 6.9 |
| M1 | $Li_4Ti_5O_{12}$ | 98 | 2 | | | 15.8 | 9.3 | 58 | 6.6 |
| M2 | $Li_4Ti_5O_{12}$ | 98 | 2 | | TMST | 17.5 | 15.7 | 90 | 5.8 |
| N1 | $Li_4Ti_5O_{12}$ | 95 | 5 | | | 15.4 | 8.4 | 54 | 6.6 |
| N2 | $Li_4Ti_5O_{12}$ | 95 | 5 | | TMST | 17.7 | 14.8 | 84 | 5.7 |
| O1 | $Li_4Ti_5O_{12}$ | 90 | 10 | | | 14.4 | 6.6 | 46 | 6.9 |
| O2 | $Li_4Ti_5O_{12}$ | 90 | 10 | | TMST | 15.2 | 10.4 | 68 | 6.5 |
| P1 | $Li_4Ti_5O_{12}$ | 90 | | 10 | | 16.4 | 8.5 | 52 | 6.9 |
| P2 | $Li_4Ti_5O_{12}$ | 90 | | 10 | TMST | 17.0 | 13.1 | 77 | 6.3 |
| Q1 | $Li_4Ti_5O_{12}$ | 30 | | 70 | | 11.2 | 9.0 | 80 | 5.5 |
| Q2 | $Li_4Ti_5O_{12}$ | 30 | | 70 | TMST | 12.0 | 12.5 | 104 | 5.2 |
| R1 | $Li_4Ti_5O_{12}$ | 10 | 20 | 70 | | 10.0 | 7.8 | 78 | 5.5 |
| R2 | $Li_4Ti_5O_{12}$ | 10 | 20 | 70 | TMST | 11.5 | 10.5 | 91 | 5.3 |
| S1 | $Li_4Ti_5O_{12}$ | 30 | 20 | 50 | | 11.0 | 7.4 | 67 | 5.6 |
| S2 | $Li_4Ti_5O_{12}$ | 30 | 20 | 50 | TMST | 12.0 | 9.8 | 82 | 5.2 |
| T1 | $Li_4Ti_5O_{12}$ | 50 | 10 | 40 | | 13.4 | 9.2 | 69 | 5.6 |
| T2 | $Li_4Ti_5O_{12}$ | 50 | 10 | 40 | TMST | 15.0 | 12.7 | 84 | 5.4 |
| L1' | CTP | 100 | | | | — | — | — | 10.2* |
| L2' | CTP | 100 | | | TMST | — | — | — | 12.6* |
| M1' | CTP | 98 | 2 | | | 16.4 | — | — | 11.4** |
| M2' | CTP | 98 | 2 | | TMST | 15.7 | — | — | 10.6** |
| N1' | CTP | 95 | 5 | | | 17.1 | 9.6 | 56 | 9.4 |
| N2' | CTP | 95 | 5 | | TMST | 17.1 | 10.7 | 63 | 9.5 |
| O1' | CTP | 90 | 10 | | | 18.2 | 9.4 | 52 | 8.8 |
| O2' | CTP | 90 | 10 | | TMST | 20.7 | 10.4 | 50 | 9.0 |

*L1' and L2': Since considerably swelled after the initial charge-discharge process, batteries are excluded. The thickness of the battery is the value after the initial charge-discharge process.
**M1' and M2': Since considerably swelled after storage at 60° C. for 7 days, batteries are excluded. The thickness of the battery is the value after storage at 60° C. for 7 days.

As shown in Table 2, with respect to the batteries having the lithium titanate negative electrode and containing the chain carboxylates as a main solvent in a ratio higher than 70 volume % in the entire volume of the nonaqueous solvent, as shown in L1 to P2, the output retention rates were considerably decreased in the low-temperature-output test carried out after the storage at 60° C. for 15 days; however, addition of TMST, TMSB, or TMSP improved the output retention rates. Further, all batteries showed little increase of the thickness of the battery after storage. In comparison of batteries having the lithium titanate negative electrode and containing TMST, the output retention rate was higher in the cases of L2, M2, and N2 containing the chain carboxylates at a ratio higher than 90 volume % in the entire volume of the nonaqueous solvent (the ratio of the cyclic carbonates was less than 10 volume %) than in the case of O2 containing the chain carboxylate at a ratio of 90 volume % in the entire volume of the nonaqueous solvent (the ratio of the cyclic carbonates was 10 volume %). From these results, it is preferable that the ratio of the chain carboxylate as a main solvent is higher than 90 volume % in the entire volume of the nonaqueous solvent and the ratio of the cyclic carbonate is preferably less than 10 volume % in the entire volume of the carbonates having no carbon-carbon double bond and the chain carboxylate contained in the nonaqueous solvent (in examples, the entire volume of the nonaqueous solvent).

In the case of batteries using Q1 to T2, which have the lithium titanate negative electrode and contain, as a main solvent, a chain carbonate or both of a chain carbonate and a chain carboxylate at a ratio more than 70 volume % in the entire volume of the nonaqueous solvent, decrease of the output retention rate was not so significant as compared with the case of using a chain carboxylate as the main solvent, nonetheless addition of TMST notably improved the output retention rate. In this case also, the ratio of the cyclic carbonate was preferably as small as possible. Further, in the case of Q2 where no cyclic carbonate is contained, even after storage under a high temperature environment of 60° C., the result was that the low-temperature-output performance was not at all decreased and increase of the thickness of the battery after the storage was also extremely slight.

On the other hand, in the case of the batteries having the carbon material negative electrode and containing the chain carboxylates as a main solvent at a ratio higher than 70 volume % in the entire volume of the nonaqueous solvents, increase in the thickness of the battery was significant. Particularly, considerable swelling of the batteries, which use 100 volume % of the chain carboxylate, after the initial charge-discharge process and the batteries, which use 98 volume % of the chain carboxylate in the entire volume of the nonaqueous solvent, after the storage at 60° C. for 7 days prevented the low-temperature-output test. The batteries having the carbon material negative electrode and containing the chain carboxylates at a ratio of 95 volume % or 90 volume % in the entire volume of the nonaqueous solvents, increase of the thickness of the battery after the storage was remarkable, too, as compared with the batteries having the lithium titanate negative electrode. Further, these batteries having the carbon material negative electrode (N1' to O2') showed an excellent output performance before storage; however, the output retention rate was notably lowered in the low-temperature-output test after the storage test at 60° C. for 15 days whether TMST was added or not.

Consequently, from these results, it can be understood that addition of TMST, TMSB, and TMSP is effective for batteries having a negative electrode with an operating potential of 1.2 V (vs. Li/Li$^+$) or higher such as the lithium titanate negative electrode but is ineffective for batteries having the carbon material negative electrode with an operating potential less than 1.2 V (vs. Li/Li$^+$) and thus the effect of the invention could not be expected from a invention for a battery having a carbon material negative electrode.

INDUSTRIAL APPLICABILITY

A nonaqueous electrolyte battery of the invention can be used for various kinds of conventional uses without any particular limitation. Especially, since the nonaqueous electrolyte battery of the invention provides an excellent low-temperature-output performance after high-temperature-storage, the nonaqueous electrolyte battery can be preferably used for various uses including power storage equipment and motive power for vehicles such as HEV.

The invention claimed is:

1. A nonaqueous electrolyte battery comprising:

a nonaqueous electrolyte which contains a nonaqueous solvent and an electrolytic salt;

a positive electrode; and a negative electrode having an operating potential of 1.2 V (vs. Li/Li$^+$) or higher;

wherein said nonaqueous electrolyte contains a chain carbonate, a chain carboxylate or both chain carbonate and chain carboxylate as a main solvent at a ratio of 70 volume % or higher in an entire volume of said nonaqueous solvent, said nonaqueous electrolyte further contains a compound defined by a general formula (1), (2), or (3):

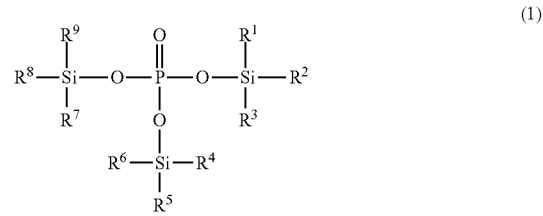

(1)

wherein $R^1$ to $R^9$ may be same or different and each denotes an organic group having 1 to 12 carbon atoms;

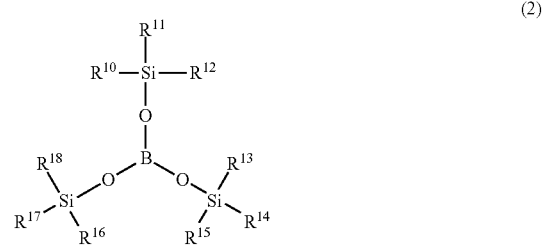

(2)

wherein $R^{10}$ to $R^{18}$ may be same or different and each denotes an organic group having 1 to 12 carbon atoms; and (3)

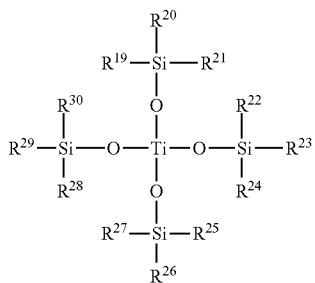

wherein $R^{19}$ to $R^{30}$ may be same or different and each denotes an organic group having 1 to 12 carbon atoms, wherein said nonaqueous electrolyte contains said chain carbonate and said chain carboxylate at a ratio higher than 70 volume % in the entire volume of said nonaqueous solvent and satisfies $0 \leq b < 30$, wherein "b" denotes the volume of a cyclic carbonate among carbonates having no carbon-carbon double bond in the entire volume, defined as 100, of said carbonates having no carbon-carbon double bond and chain carboxylates in said nonaqueous solvent.

2. The nonaqueous electrolyte battery according to claim 1, wherein said nonaqueous electrolyte further contains a compound defined by said general formula (1).

3. The nonaqueous electrolyte battery according to claim 1, wherein said nonaqueous electrolyte further contains a compound defined by said general formula (2).

4. The nonaqueous electrolyte battery according to claim 1, wherein said nonaqueous electrolyte further contains a compound defined by said general formula (3).

5. A nonaqueous electrolyte battery comprising:
 a nonaqueous electrolyte which contains a nonaqueous solvent and an electrolytic salt;
 a positive electrode; and
 a negative electrode having an operating potential of 1.2 V (vs. Li/Li$^+$) or higher;
 wherein said nonaqueous electrolyte contains a chain carbonate, a chain carboxylate or both chain carbonate and chain carboxylate as a main solvent at a ratio of 70 volume % or higher in an entire volume of said nonaqueous solvent, said nonaqueous electrolyte further contains a compound defined by a general formula (1), (2), or (3):

(1)

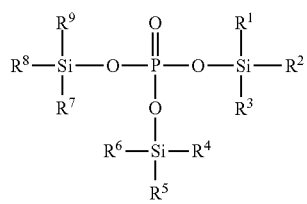

wherein $R^1$ to $R^9$ may be same or different and each denotes an organic group having 1 to 12 carbon atoms;

(2)

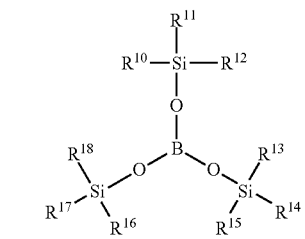

wherein $R^{10}$ to $R^{17}$ may be same or different and each denotes an organic group having 1 to 12 carbon atoms; and (3)

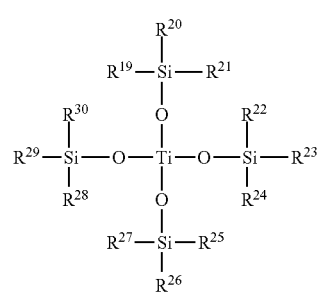

wherein $R^{19}$ to $R^{30}$ may be same or different and each denotes an organic group having 1 to 12 carbon atoms, wherein said nonaqueous electrolyte contains said chain carboxylate at a ratio higher than 90 volume % in the entire volume of said nonaqueous solvent and satisfies $0 \leq c < 10$, wherein "c" denotes the volume of a cyclic carbonate among carbonates having no carbon-carbon double bond in the entire volume, defined as 100, of said carbonates having no carbon-carbon double bond and chain carboxylates in said nonaqueous solvent.

6. The nonaqueous electrolyte battery according to claim 5, wherein said nonaqueous electrolyte further contains a compound defined by said general formula (1).

7. The nonaqueous electrolyte battery according to claim 5, wherein said nonaqueous electrolyte further contains a compound defined by said general formula (2).

8. The nonaqueous electrolyte battery according to claim 5, wherein said nonaqueous electrolyte further contains a compound defined by said general formula (3).

9. A nonaqueous electrolyte battery comprising:
 a nonaqueous electrolyte which contains a nonaqueous solvent and an electrolytic salt;
 a positive electrode; and
 a negative electrode having an operating potential of 1.2 V (vs. Li/Li$^+$) or higher;
 wherein said nonaqueous electrolyte contains a chain carbonate, a chain carboxylate or both chain carbonate and chain carboxylate as a main solvent at a ratio of 70 volume % or higher in an entire volume of said nonaqueous solvent, said nonaqueous electrolyte further contains a compound defined by a general formula (1), (2), or (3):

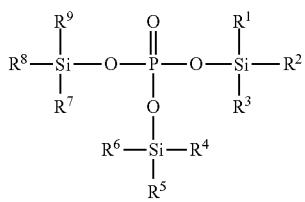
(1)

wherein $R^1$ to $R^9$ may be same or different and each denotes an organic group having 1 to 12 carbon atoms;

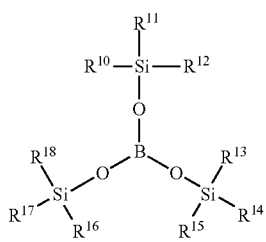
(2)

wherein $R^{10}$ to $R^{18}$ may be same or different and each denotes an organic group having 1 to 12 carbon atoms; and

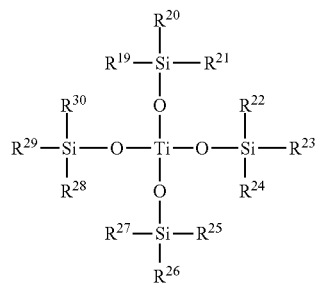
(3)

wherein $R^{19}$ to $R^{30}$ may be same or different and each denotes an organic group having 1 to 12 carbon atoms, wherein said negative electrode contains spinel lithium titanate.

10. The nonaqueous electrolyte battery according to claim 9, wherein said nonaqueous electrolyte further contains a compound defined by said general formula (1).

11. The nonaqueous electrolyte battery according to claim 9, wherein said nonaqueous electrolyte further contains a compound defined by said general formula (2).

12. The nonaqueous electrolyte battery according to claim 9, wherein said nonaqueous electrolyte further contains a compound defined by said general formula (3).

* * * * *